(12) United States Patent
Goodwin

(10) Patent No.: US 6,648,010 B1
(45) Date of Patent: Nov. 18, 2003

(54) CHECK VALVE PLATE WITH ANTI-PRESSURE SURGE DEVICE

(75) Inventor: Richard Stanley Goodwin, Staffordshire (GB)

(73) Assignee: Goodwin International Limited (GB)

( * ) Notice: Subject to any disclaimer, the term of this patent is extended or adjusted under 35 U.S.C. 154(b) by 0 days.

(21) Appl. No.: 09/913,215

(22) PCT Filed: Feb. 10, 2000

(86) PCT No.: PCT/GB00/00415

§ 371 (c)(1),
(2), (4) Date: Nov. 21, 2001

(87) PCT Pub. No.: WO00/47924

PCT Pub. Date: Aug. 17, 2000

(30) Foreign Application Priority Data

Feb. 12, 1999 (GB) .............................................. 9903250
Mar. 25, 1999 (GB) .............................................. 9906980
Sep. 6, 1999 (GB) .............................................. 9921010

(51) Int. Cl.$^7$ ........................ F16K 47/02; F16K 15/03
(52) U.S. Cl. ................. 137/493.1; 137/512.3; 137/527; 137/491; 137/540; 251/282
(58) Field of Search ......................... 137/512.1, 512.2, 137/512.3, 527, 527.8, 491, 493.1, 540; 251/282

(56) References Cited

U.S. PATENT DOCUMENTS 3,212,520 A * 10/1965 Carlton .................... 137/493.1
3,942,551 A * 3/1976 Schuller et al. ............. 137/514
4,180,066 A * 12/1979 Milliken et al. ......... 137/493.1
4,188,973 A * 2/1980 Weise et al. ................. 137/514
4,693,269 A 9/1987 Yamada
4,694,853 A * 9/1987 Goodwin .................. 137/512.1
5,392,810 A * 2/1995 Cooper et al. ........... 137/512.1

FOREIGN PATENT DOCUMENTS

| DE | 3341433 | 5/1985 |
| JP | 8338564 | 12/1996 |
| JP | 10213240 | 8/1998 |
| JP | 10292874 | 11/1998 |

* cited by examiner

Primary Examiner—Michael Powell Buiz
Assistant Examiner—Ramesh Krishnamurthy
(74) Attorney, Agent, or Firm—Harness, Dickey & Pierce, P.L.C.

(57) ABSTRACT

An ant-pressure surge device mounted in or on a closure member (1) of a check valve to eliminate overpressure and reduce shock waves in a pipeline when the check valve closes. The anti-pressure surge device comprises a fast acting flow relieving valve having a flow path sufficient in the open position to relieve the reverse flow on closure of the check valve closure member and is designed to open when the back pressure shock wave on the downstream side of the valve approaches a predetermined value. A suitable anti-pressure surge device comprises a poppet comprising a piston portion (7) and a sealing element (7A) moveable by the back pressure shock wave against resilient disk springs (10).

22 Claims, 8 Drawing Sheets

CHECK VALVE PLATE WITH ANTI-PRESSURE SURGE DEVICE

BACKGROUND OF THE INVENTION

The present invention relates to an anti-pressure surge device mounted on or in the sealing element of a check especially a dual plate check valve.

Check valves of known types such as tilt disk check valves, swing check valves and dual plate check valves are well known in the art and are used in a pipe line to allow flow to go in one direction called the forward flow direction but to automatically shut if flow in the line reverses. The shutting action is effected by the line fluid acting on the closure member generally termed the plate of the check valve. Once the closure member of the valve is seated in the closed position no further reverse flow can take place.

Pipelines are designed to a given pressure class rating. The higher the pressure class rating the thicker the walls of the components in the pipeline have to be to withstand that pressure. The effect of closure of check valves can however necessitate the pressure class of the pipeline being increased with a substantial increase in the cost of the pipeline in order to accommodate surges in pressure associated with the closure of the check valves. Different types of check valves close at different rates for the same line condition. When reverse flow begins, causing the check valve to close, reverse velocity of fluid in the pipe is built up in the time taken for the valve to close. Once closed, the continued momentum of the fluid causes a downstream pressure peak considerably above the original line pressure which may then oscillate with decaying peaks above the original line pressure until the line pressure stabilises. It is these peaks that give the piping engineer a pressure class rating problem and with the associated water hammer gives the piping engineer a pipework foundation problem.

Typically check valves would find application in a system where the fluid was being pumped in a direction (the downstream direction) against a system deceleration, in other words a deceleration that would be experienced when the pump is turned off. The check valves are intended to prevent the system deceleration from causing the fluid to return in the upstream direction if pump power is turned off or lost. Any check valve will take a period of time to close. The time in which the check valve closes when exposed to a given system deceleration when reverse flow occurs is known as the response time. If the check valve has a fast response time to a reverse system deceleration, then only a low reverse flow velocity (Vr max) will be reached by the time the check valve has closed. Conversely if the check valve has a slow response time then a high reverse flow velocity will be reached by the time the check valve has closed. The Vr max may in itself be a problem to pumps being rotated backwards for a short time, but the more serious problem is the instantaneous halting of the column of fluid that occurs when the check valve member does close. The weight of the fluid column on large valves can be many tons. This force, resulting from the change of kinetic energy of the fluid being brought to an abrupt halt by the closed check valve, is transmitted through the check valve to the adjacent pipework. The resultant forces on foundations can be very severe. The instantaneous halt of the column of liquid when a check valve closes may be considered to give rise to a pipeline pressure increase according to the Joukowsky formula:

Pressure rise=Speed of sound in the fluid line×(Vr max)×the fluid density

The problem facing piping engineers when they have a naturally high system deceleration and when the check valve has a moderate or slow response combining to provide a high Vr max is the potential of the line pressure rising excessively due to the Joukowsky pressure surge. Furthermore the high Vr max can also lead to severe vibration of pipework foundations due to the water hammer effect.

A pipeline designer worried about over pressure may choose to specify a higher pipeline pressure rating, but at a considerable additional cost, or may choose to specify a check valve which minimises the reverse pressure effect. The reverse pressure effect can be minimised by selecting a valve which closes more rapidly so allowing less time for build up of reverse velocity. Thus the designer may choose a nozzle valve in preference to a dual plate check valve, swing check valve or a tilting disk check valve. However the nozzle valve does require a wider body to achieve comparable flow characteristics to a dual check valve and it may not always be suitable. Moreover the cost of a nozzle valve may be at least four times that of a dual plate check valve.

Swing check valves due to the distance that the closure member has to travel can seldom be made to close quickly enough for systems with high dv/dt. One solution is to attach a damping mechanism to the closure member to prevent slam, that is to say dramatically to slow down speed of closure over the final distance of travel, or fit a bypass loop around the check valve. This in part defeats the purpose of the check valve. The damping mechanisms are difficult to set up and maintain. Also the associate reverse flow through pumps and compressors must be acceptable which may be a particular problem with multiple pumps in parallel.

Dual plate check valves have commonly been in use for over 35 years. They are manufactured by over 40 companies throughout the world. The dual plate check valve closes much faster than the swing check valve, but does not close as fast as the nozzle valve. For applications where there is a risk of rapid reverse flow occurring, pipeline specifiers often resort to the much more expensive nozzle valve due to potential problems of over pressure. Additionally or alternatively the specifiers may specify a pressure relief pipe loop which has the disadvantage of breaking the pressure boundary provided by the pipe. Fitting a dual plate check valve with a stronger spring may help to increase the speed of closure but also increases the critical velocity. If the specified velocity is above the natural pipeline flow rate, the plates of the valve never fully open and the pressure drop across the valve is high.

JP 10213240 discloses a dual plate check valve where each plate is fitted with two sub-valves. The first sub-valve can be opened so as to discharge pressure to the outlet side without opening the main plate when there is a modest flow in the downstream direction. This is said to prevent chattering at low flow rates which can cause wear and tear. The second sub-valve opens when excessive pressure from the outlet side occurs to let pressure off to the inlet side. The second sub-valve is described as providing pressure relief to avoid damage to valve components. The flow paths of the second sub-valve as depicted would enable the second sub-valve to perform the function of relieving excess pressure but would not be expected to limit the surge effect on valve closure. Thus a system using a check valve in accordance with JP 10213240 would be expected to experience the full Joukowsky pressure effect on closure of the check valve.

SUMMARY OF THE INVENTION

According to the present invention there is provided a high flow rate anti-pressure surge device mounted, preferably removably, in or on the closure member of a dual plate, tilting disk or swing check valve wherein the anti-pressure surge device comprises a pressure sensitive valve which allows flow in an upstream or reverse direction when subjected to a reverse pressure differential exceeding a predetermined limit. Such a device can substantially reduce the level and/or duration of pressure peaks when the valve closes and can also suppress pressure oscillations in the pipeline. This has the effect of avoiding the need for the pipeline engineer to have to upgrade the pressure class of the pipeline.

In a preferred embodiment the anti-pressure surge device operates by the effect of the back pressure shock wave acting on a piston face which at a certain excess pressure of the downstream side coupled with the drop of pressure on the upstream side allows the piston to move against an appropriate resilient force such as a spring or hydraulic force to allow flow to pass backwards through the one way valve with a flow rate sufficient to reduce the peak pressure below the Joukowsky pressure which would arise in the absence of the device and/or to dissipate some of the energy associated with the Joukowsky pressure which would arise in the absence of the device.

The invention will be more clearly described by way of example only by reference to the attached figures in which:

BRIEF DESCRIPTION OF THE DRAWINGS

In the Figures the same elements are represented by the same numbers.

DETAILED DESCRIPTION OF THE PREFERRED EMBODIMENTS

Figure 1:
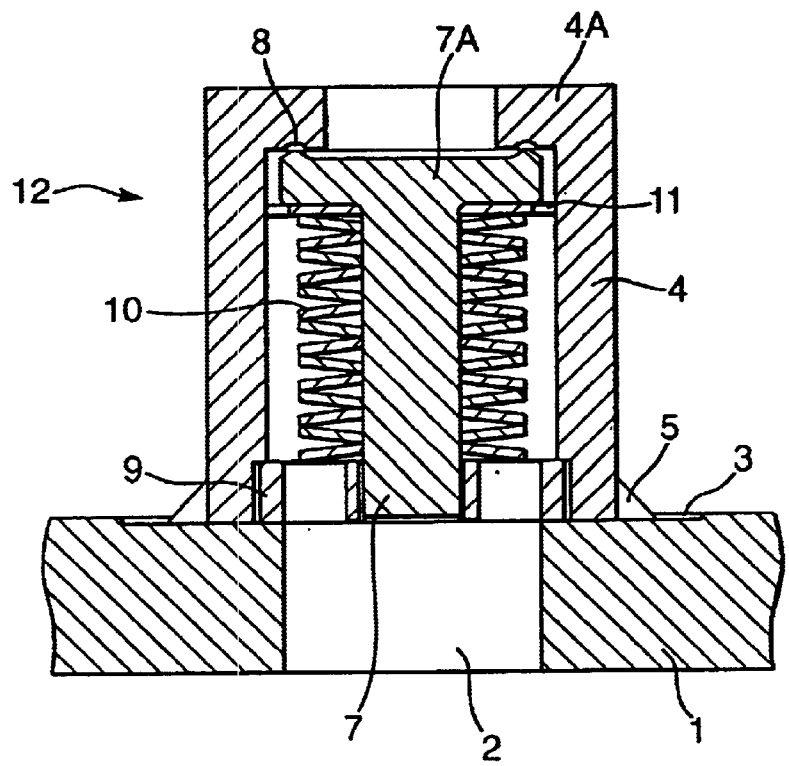
FIGS. 1 to 9 are diagrammatic cross-sections through embodiments of an anti-pressure surge device mounted in or on the sealing element of a check valve in accordance with the present invention.

FIG. 1 shows an anti-pressure surge device (12) mounted in a sealing element (1) of a check valve. A sealing element (1) of a check valve such as the plate of a dual plate check valve, swing check valve or tilting disk check valve is provided with a bore (2). An annular area (3) surrounding the bore (2) on the downstream face of the plate (1) is spot faced to form a spot face annular portion (3) to receive a cylindrical device housing (4). The cylindrical device housing (4) has an inner diameter slightly greater than the diameter of the bore (2) and an outer diameter slightly less than the outer diameter of the spot faced annulus area (3). A first end of the cylindrical housing is welded to the spot faced annular region (3) of the downstream face of the plate (1). The second end of the cylinder is partially closed to leave an opening in the end face (4A) of the housing (4) a cylindrical piston (7) or poppet comprising a first cylindrical body portion and a second wider cylindrical top portion (7A) is mounted within the housing (4) with second portion (7A) in sealing engagement with the inside of the top plate (4A) of the housing (4). To assist sealing engagement the second portion (7A) of the piston (7) is provided with a raised annular portion (3B) for sealing engagement with a seal element (8) located in a groove formed in the top plate (4A) of housing (4). The seal is preferably a metal to metal seal with seal element (8) comprising a harder metal insert in the metal body of the housing (4). The piston (7) is held in sealing engagement with the top plate (4A) of housing (4) by means of disk springs (10) acting between a tension ring (9) and a spacer ring (11). Spacer ring (11) is in abutting engagement with the non-sealing face of second portion (7A) of the piston (7). The tension ring (9) is in abutting engagement with the downstream face of the plate (1). The spacer ring (11) and tension ring (9) are formed so as to allow the passage of fluid such as by being made in a wagon wheel or star or cross shape or otherwise being perforated in a manner to enable a high flow rate.

Figure 2:
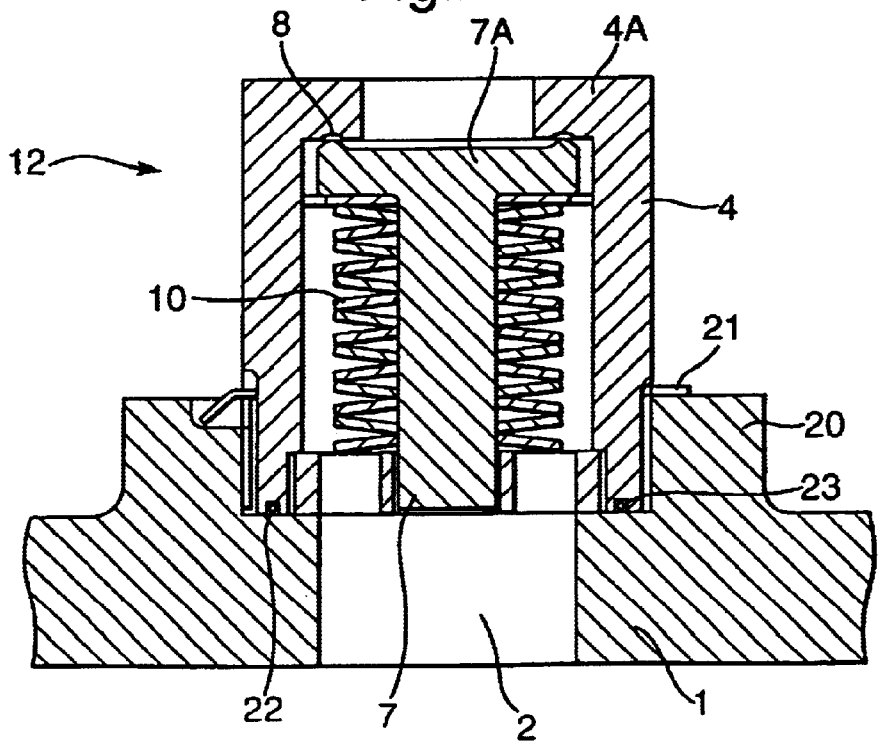

In FIG. 2 the housing (4) of the anti-pressure surge device (12) is screw mounted into a raised boss (20) formed on the downstream face of the plate (1). The assembly is provided with a tab washer (21) and an elastomeric sealing element (22) located in an annular groove (23) formed in the first end of the housing (4). Advantageously the device is removable to allow replacement if required and to allow recalibration.

Figure 3:
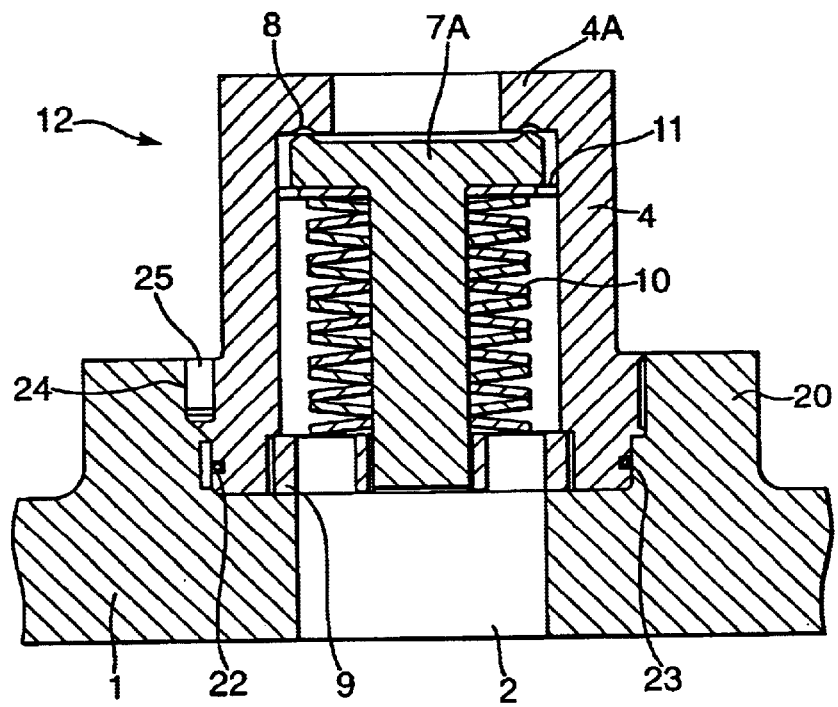

In an alternative embodiment according to FIG. 3 the device (12) is screwed into a raised boss (20) on the downstream face of the plate by means of device (12) to screws (20) fitted into holes (22) drilled and tapped on assembly. FIG. 3 shows a seal between the device (12) and the plate (1) by means of a sealing means (22) in an annular groove (23) on the outer cylindrical face of the device (12) as an alternative to the location on the sealing means (22) and the groove (23) shown in FIG. 2.

Figure 4:
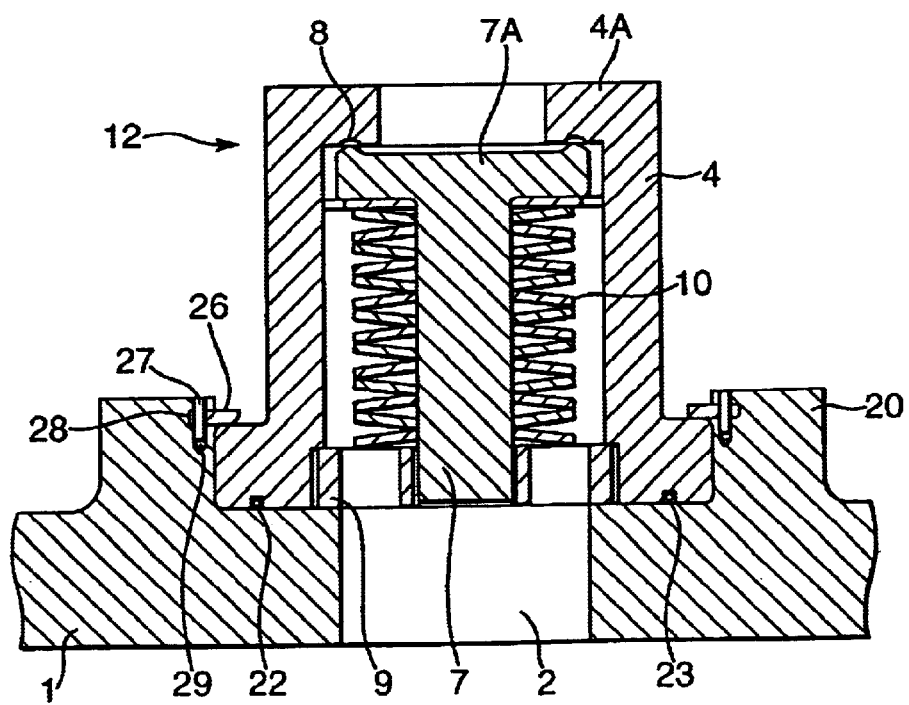

In a further embodiment according to FIG. 4 the device (12) may be held in place by keeper plates (26) located in radially extending grooves (28) formed in a raised boss (20) on the downstream face of the plate (1) and retained by screws or pins (27) in bores (29) formed in the raised boss (20).

Figure 5:
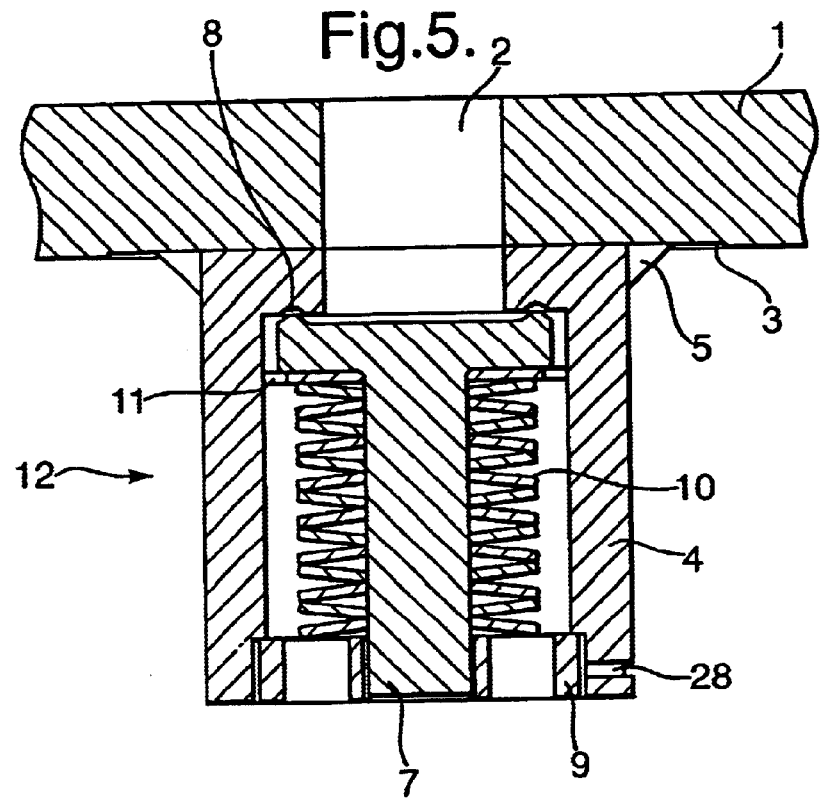

In a further embodiment according to FIG. 5 the device is located on the upstream face of the plate (1) in a reverse orientation. The tension ring (9) is held in place by one or more tension ring retaining screws (28).

Figure 6:
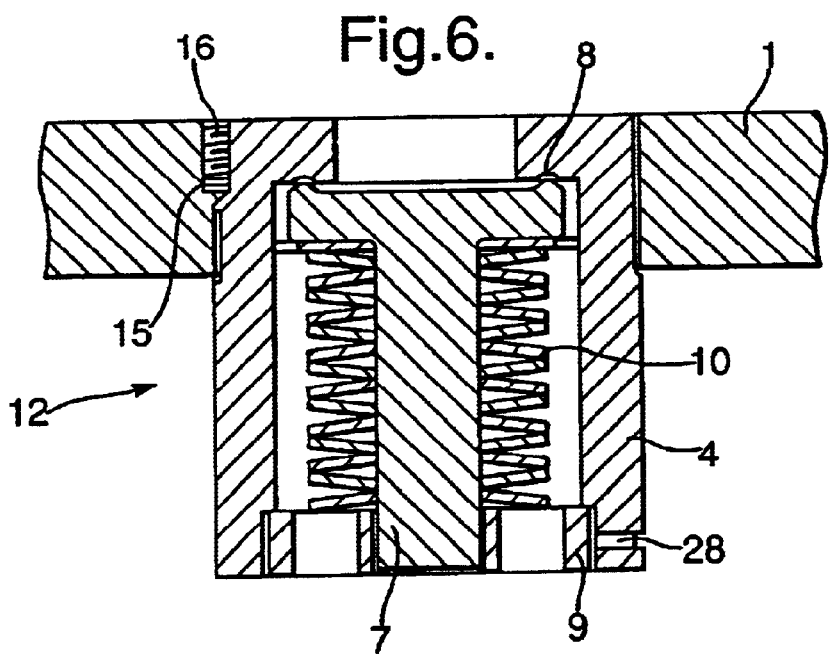

In a further embodiment according to FIG. 6 the device is mounted in the bore (2) formed in the plate (1) and retained in place by screws (16) fitted into holes (15) drilled and tapped on assembly.

Figure 7:
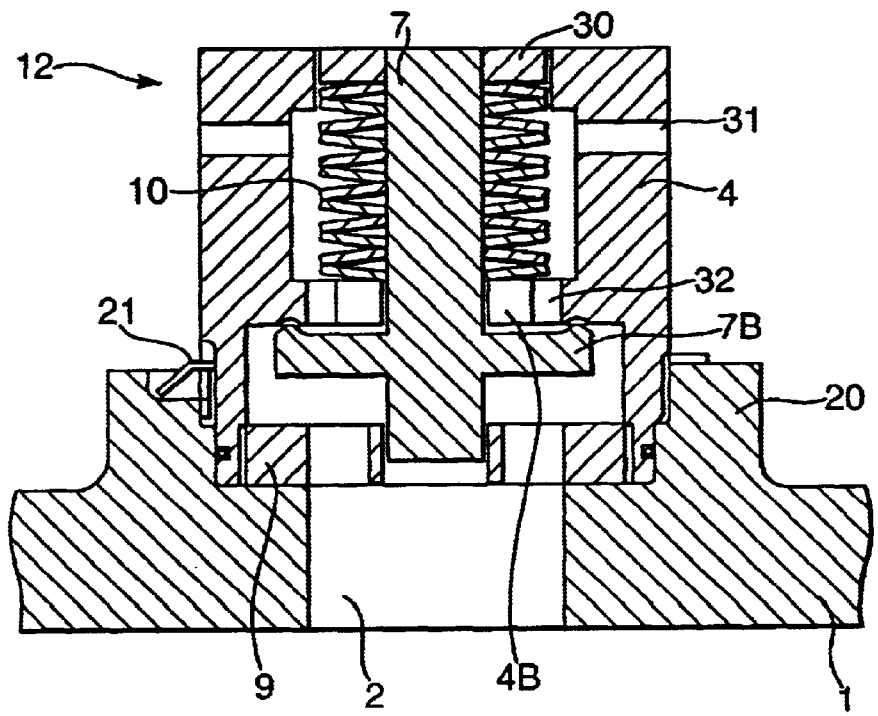

In a further embodiment according to FIG. 7 bleed holes (31) are provided in the outer cylindrical wall of the housing (4). Housing (4) is provided with a cross piece (4B) in which bleed holes (32) are formed. An enlarged cylindrical portion (7B) of the piston (7) lies between the cross piece (4B) and ring (9) such that in the closed position the enlarged cylindrical portion (7B) of the piston (7) seals against the cross piece (4B) of the housing (4). The disk springs (10) are contained between the cross piece (4B) of the housing (4) and a tension ring (30) located at the downstream face of the housing (4).

Figure 8:
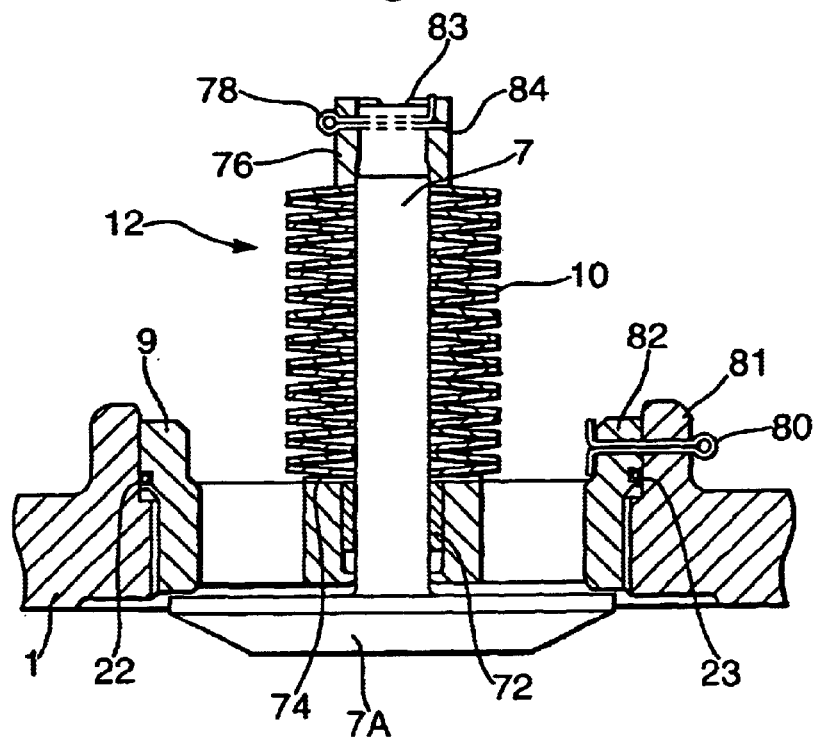

FIG. 8 shows a further poppet valve for use in the present invention. A ring 9 formed to allow passage of fluid such as by being made in a wagon wheel or star shape or otherwise being perforated has a central bore fitted with a friction reducing sleeve (72) which may be made for example from phosphor bronze. A poppet (7) has a main piston body slidably mounted within this sleeve (72) and has an enlarged mushroom head sealing element (7A) at the upstream side which sealingly engages with the outer rim of the ring element (9). The ring element (9) is located within a through bore formed in the check valve plate (1) such as by being screw mounted. As illustrated an O ring (22) in a groove (23) formed in the outer cylindrical wall of the ring element (9) helps to reduce rotation. Rotation may be further controlled by use of one or more retaining pins such as a split pin (80) inserted through bores (81, 82) respectively formed in a downstream projection formed on the check valve plate and in the cylindrical wall of the ring element (9). Disk springs (10) surround the piston body (7) and are retained by means of an adjustable nut (76) engaged with a thread formed at the downstream end of the piston body (7). To prevent rotation of the nut (76) it may be provided as illustrated with a retaining pin such as a split pin (78) which passes through bores (83,84) formed respectively in the end portion of piston (7) and the retaining nut (76). As illustrated the upstream end of the disk springs (10) may bear on a bearer plate in abutting engagement with a downstream phase of the ring element (9), and may be formed of any appropriate material such as bronze, stainless or carbon steel. This embodiment of poppet valve is advantageous because of its cheapness of manufacture and ease in assembly and disassembly allowing, for example, easy replacement of the poppet (7).

In the preferred embodiments of the invention, the pressure acting on the piston which is at a certain excess pressure on the downstream side coupled with the drop in pressure on the upstream side allows flow to pass backwards through the one way valve.

While the device (12) has been shown in the form of a piston (7) or poppet acting against disk springs (10) the piston (7) may act against any resilient means including hydraulic means.

Figure 9A:
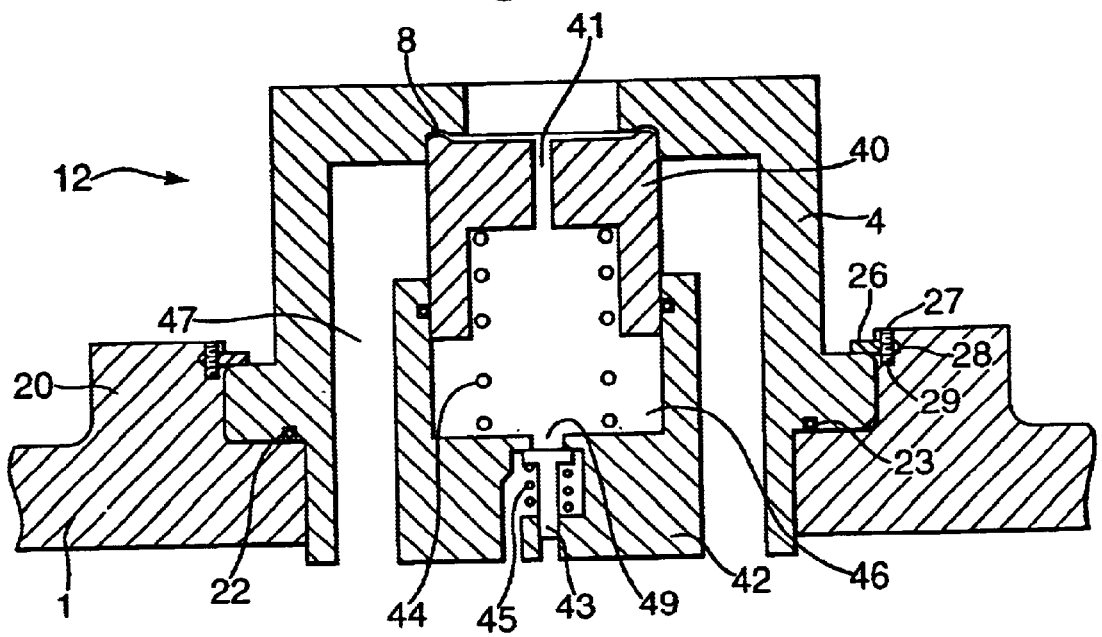
Figure 9B:
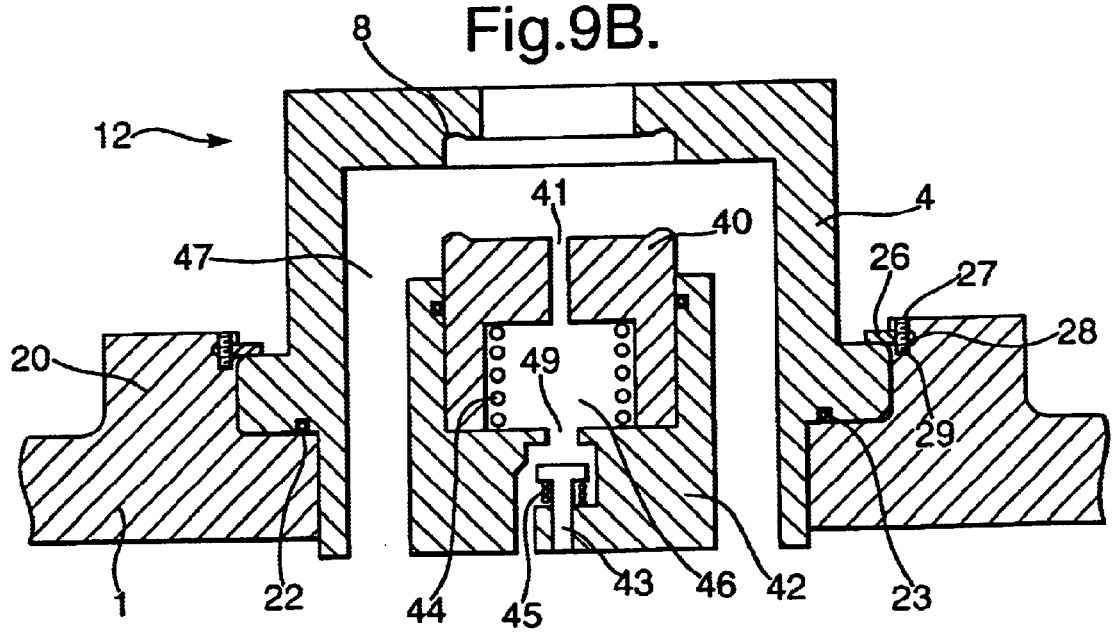

The above illustrated embodiments are suitable for relatively low class ratings where the disk springs can provide a sufficient resilience to prevent the device from opening unless a pressure approaching the line pressure rating is reached. For higher pressure systems the disk springs may not provide sufficient resilience. A further embodiment is shown in FIG. 9A and FIG. 9B which is particularly suitable for high pressure applications. This is a high flow pressure balanced surge relief valve. A high flow balance spool (40) is provided within the housing (4). The high flow balance spool (40) is fitted with a bleed line (41) providing access to a chamber (46) communicating with an opening (49) in valve component (42) which in the closed position is sealed by a piston (43). The bleed line creates a balanced pressure so that the high flow balance spool (40) remains in its closed position until the pressure reaches a sufficient level that it causes the piston (43) to open against its associated spring (45) when the valve opens to the position shown in FIG. 8B where fluid can flow through passages (47) in the valve. By providing a reduced area valve on the balanced side a small but strong spring (45) operating on the piston (43) can control the valve to open only once the required pressure is reached whilst the return spring (44) acting on the high flow balance spool (40) need be strong enough only to return the high flow balance spool when the piston (43) closes.

The anti-pressure surge device (12) should be robust and able to withstand the internal operating pipeline environment.

Preferably the anti-pressure surge device (12) should be a fast acting flow relieving valve as it is the kinetic energy of the flow when brought to an abrupt halt that compresses and creates the pressure rise. The flow paths in the device (12) should be sufficient to relieve a substantial part of the reverse flow such as 5%, preferably 10% and more preferably at least 20% and up to be 30% or 40% or more. While the description and figures illustrate preferred embodiments other devices may be selected by those skilled in the art with suitable characteristics to operate in accordance with the invention.

The primary function of the anti-pressure surge device is as a flow relieving valve. It is intended to limit the pressure rise by preventing excessive pressure arising. This is in contrast to a pressure relief system which operates simply to relieve excess pressure once this has occurred. In order to achieve this anti-pressure surge function the anti-pressure surge device should permit substantial flow in the reverse direction when the differential pressure between the downstream side of the check valve and the upstream side exceeds a predetermined level. The predetermined level may be set to take into account the valve and pipeline characteristics in use such as by setting the predetermined level, for example by an appropriate spring selection or setting, to enable opening of the pressure surge device when the differential pressure exceeds by a specified percentage the maximum stagnant flow pressure on the downstream side of the valve. Preferably the differential pressure excess percentage above which the anti-pressure device will open may be between 5% and 20%, more preferably 10% to 15%.

By analogy with the car seat belt, which extends a time during which a passenger comes to a full stop in the event of an accident by having a degree of stretch in the webbing, the pressure relief valve extends the time for the fluid moving in the reverse direction to reach a complete stop. In contrast to other pipeline pressure relief devices, by nature of the very large amount of flow allowed through the anti-pressure surge device the device actually prevents the pressure rise which would otherwise be experienced. Preferably the flow path cross section through the anti-pressure surge device (or the aggregate for the devices if more than one) is at least 2% of the flow path cross section through the open check valve. Thus for a dual plate check valve with a pair of plates each fitted with an anti-pressure surge device the flow path cross section of the anti-pressure surge device should preferably be at least 2% of the cross sectional area of one of the D-shaped check valve openings. If the cross sectional flow area of the anti-pressure surge device is too large, a significant Joukowsky surge effect may be experienced on closure of the anti-pressure surge device. Thus the cross sectional flow area of the device, or aggregate cross sectional flow area of the devices if more than one is fitted, should preferably be between 2% and 20% of the cross sectional flow area through the open check valve, more preferably 3 to 15% and more preferably 4 to 10%, especially 4 to 6%.

By using an anti-pressure surge device the peak pressure may be reduced by up to 40% or more of the Joukowsky pressure which would have been seen on the same valve not fitted with such an anti-pressure surge device under the same condition. Furthermore the anti-pressure surge device may enable up to 40% or more of the pressure head energy which would otherwise impact the valve pipeline system to be dissipated. Any significant reduction of the pressure peak or pressure head energy of for example 10% or more preferably 20% to 30% or more may enable a dual plate check valve fitted with such an anti-pressure surge device to be specified in appropriate circumstances where otherwise a more expensive nozzle valve might be required.

Figure 10:
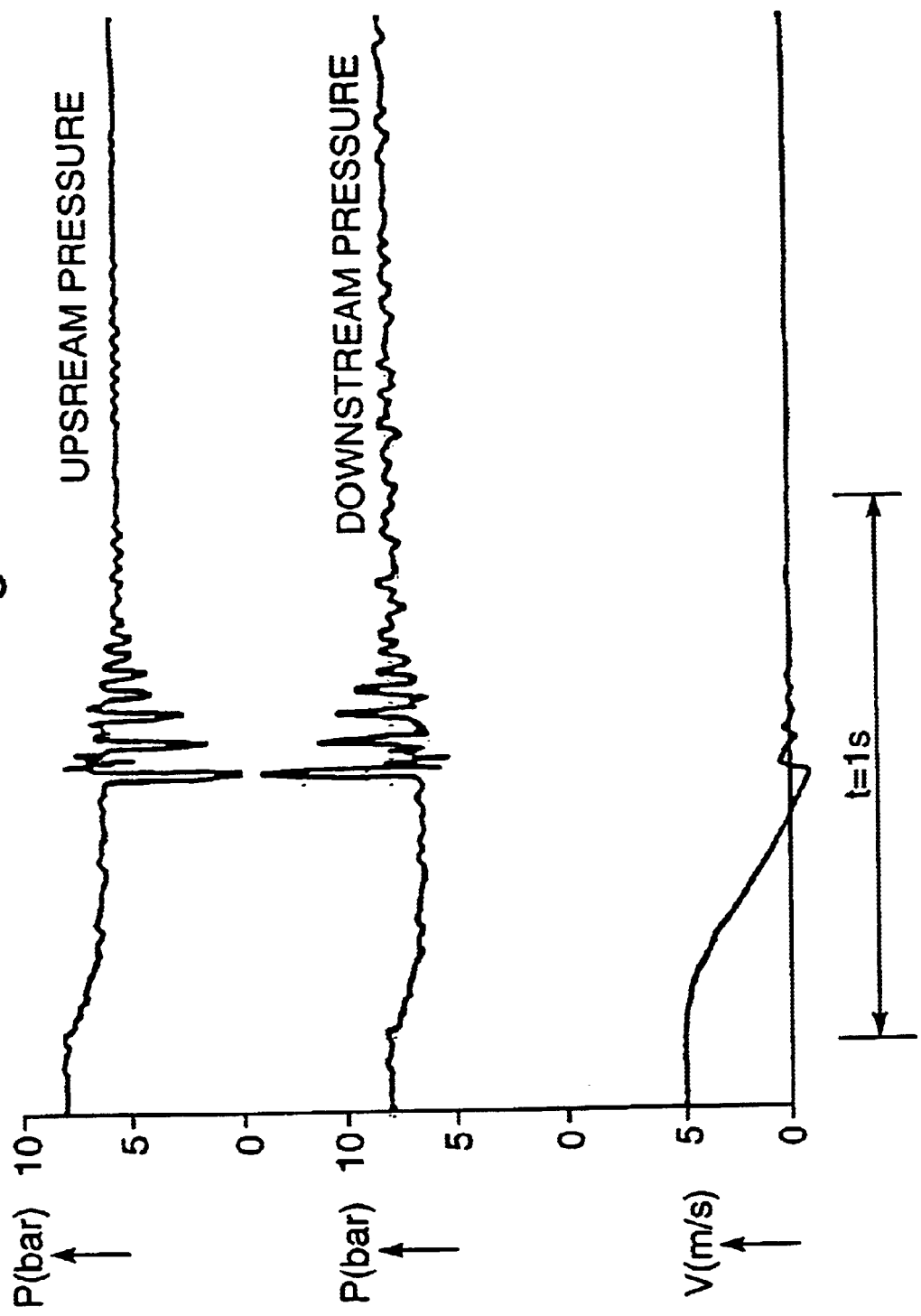
FIG. 10 is a diagrammatic representation of the recording of a dynamic test on a dual plate check valve.

FIG. 10 demonstrates a typical recording for a dynamic test of a dual plate check valve. Initially as the plate begins to close the downstream pressure reduces. Once the plates are fully closed the pipeline pressure peaks considerably above the original line pressure and then oscillates with decaying peaks above the original line pressure until the line pressure stabilises. It is these peaks and the forces and energy associated with these peaks that give the piping engineer a pressure class rating problem. By incorporating an anti-pressure surge device in the plate according to the present invention the device acts as a fast acting flow relieving valve to prevent the kinetic energy flow being brought to such an abrupt stop.

Figure 11:
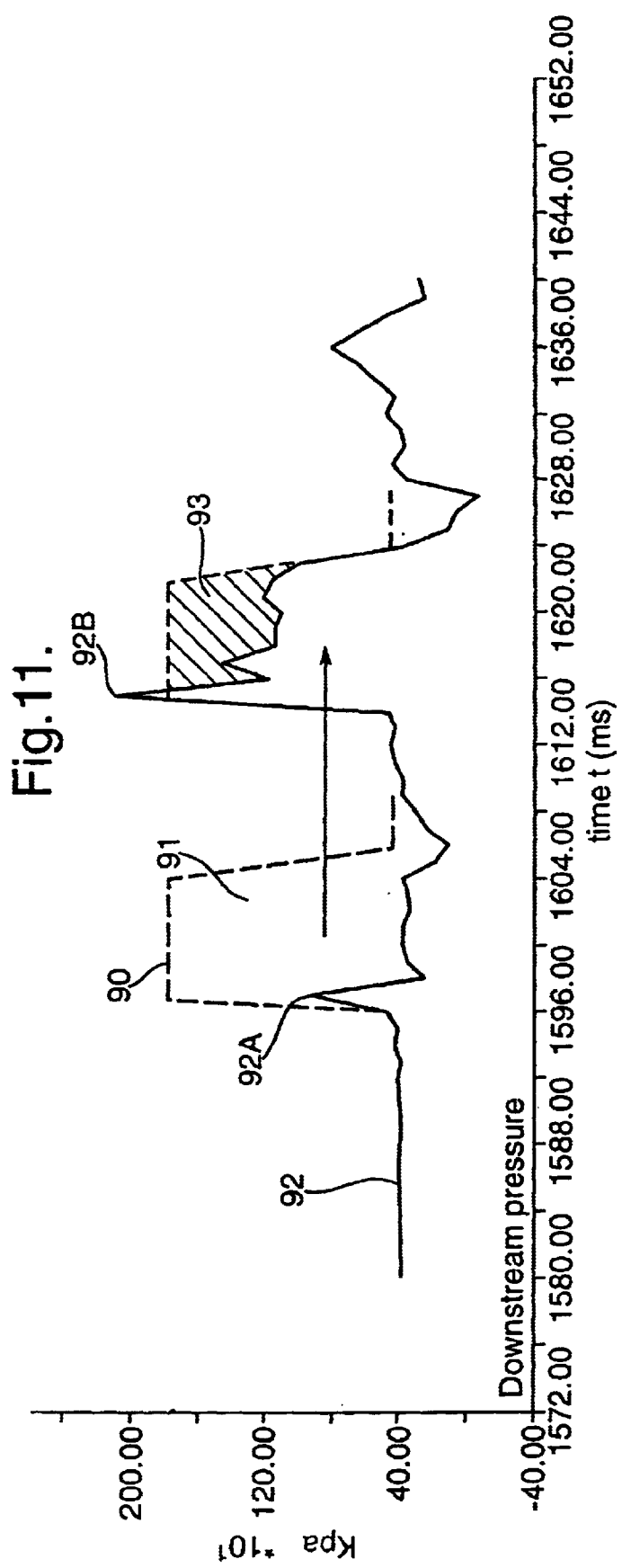
FIG. 11 is a diagrammatic representation of the wording of a dynamic test on a dual plate check valve fitted with an anti pressure surge device.

FIG. 11 shows the results of dynamic tests carried out on a dual plate check valve (Goodwin International Limited 32" 150 Dual Plate Check Valve, medium spring) with anti-pressure surge device (of the design shown in FIG. 8 with an internal diameter of about 100 mm, one device per plate with a preset spring tension of about 50 psi (345 kPa)) compared with the dynamic characteristics with the same valve without anti-pressure surge device.

Without anti-pressure surge device the downstream pressure would develop according to the dotted line (90) on FIG. 11. The pressure change consists of an instantaneous pressure rise at the instant of valve closure followed by a further gradual increase of the downstream pressure after valve closure. The instantaneous pressure rise is caused by the reduction of reverse flow velocity to zero, as described above, and is known as the Joukowsky pressure change. The further gradual increase of pressure is caused by the inertia of the downstream fluid column, which continues to decelerate immediately after valve closure until such time as the pressure is reduced by system reflection.

In the example and discussion that follows:

$c$=propagation speed of pressure waves (speed of sound) (=1200 ms$^{-1}$ in the example)

L=length of pipe between check valve and constant head boundary of test system (=5.98 m in the example)

reflection time=$L/2c$(=10 ms in the example)

$\rho_f$=fluid density (Kg m$^{-3}$) (water in the example 1000 Kgm$^{-3}$)

dv/dt=system deceleration (=6.00 ms$^{-2}$ in the example)

v begin=initial flow velocity before pump shut off (=3.03 ms$^{-1}$ in the example)

$v_R$=maximum reverse flow velocity (1.1 ms$^{-1}$ in the example)

A=cross sectional area of pipe (internal diameter 786 mm in the example)

$\Delta P$=Joukowsky pressure=$\rho_f c v_R$(1320 kPa in the example)

Water was pumped at initial velocity v begin through the dual plate check valve along a pipe of length L to a constant head boundary providing a system deceleration on pump failure (switch off) of dv/dt.

For a column of length L the period of the pressure surges in a system with a closed valve at one end and constant head boundary at the other end is typically 4L/c seconds. The duration of the pressure wave differs from location to location. At the closed end (check valve) the duration is 2L/c, while at the open end (downstream constant head reservoir) the duration becomes zero.

Pressure surges are the result of kinetic energy of the fluid, which is converted into pressure (head) energy. Just before valve closure, the kinetic energy of the fluid is proportional to the mass m of the fluid column and the maximum reverse flow velocity VR squared. The mass of the fluid column is m=$\rho_f$LA. The kinetic energy of the fluid column is now described by: E=½×($\rho_f$LA)×$v_R^2$, which may be written as E=($\rho_f c\, v_R$)×2L/c×¼A $v_R$. This demonstrates that for a given $v_R$ the energy stored in the fluid is proportional to and may be represented by the magnitude of the pressure surge $\Delta P$=$\rho_f c v_R$(the Joukowsky term between brackets) times the duration of the pressure surge (represented by the reflection time 2L/c). The stored energy is therefore represented by the area (91) in FIG. 11 under the dotted line (90).

With anti-pressure surge device the downstream pressure develops according to the solid line (92) in FIG. 11. At the instant of valve closure (92A) the instantaneous downstream pressure rise and upstream pressure drop (Joukowsky changes) start to develop, but are immediately cut off by the fast opening anti-pressure surge device. Due to the decreasing pressure difference across the anti-pressure surge device it closes after about 2 ms. In this short time interval only the fluid adjacent to the check valve is brought to a standstill. After 18 ms the pressure peak arises again, due to the kinetic energy of the rest of the fluid column, which is still in motion (92B). The original pressure rise is delayed by the interaction of the pipeline system and anti-pressure surge device. At this instant the anti-pressure surge device reopens and cuts off the pressure peak again. Using the magnitude and duration of the Joukowsky pressure surge as a reference value, about 40% of the pressure (head) energy is dissipated by the anti-pressure surge device in this example (as represented by the shaded area (93) in FIG. 11).

From FIG. 11 it can be seen that the maximum downstream pressure arose just before the second opening of the anti-pressure surge device in the form of a pressure spike with a duration of less than 1 ms before it was reduced by some 40%. A pressure spike with such a short duration and therefore low energy would not be expected to cause significant damage. The piping codes allow the design pressure to be exceeded by 10% of 15% for a short period. Therefore even in situations where use of an anti-pressure surge device according to the invention gives rise to a transient pressure spike, the energy dissipation achieved by use of the anti-pressure surge device is effective in protecting the pipeline components from damage.

Figure 12:
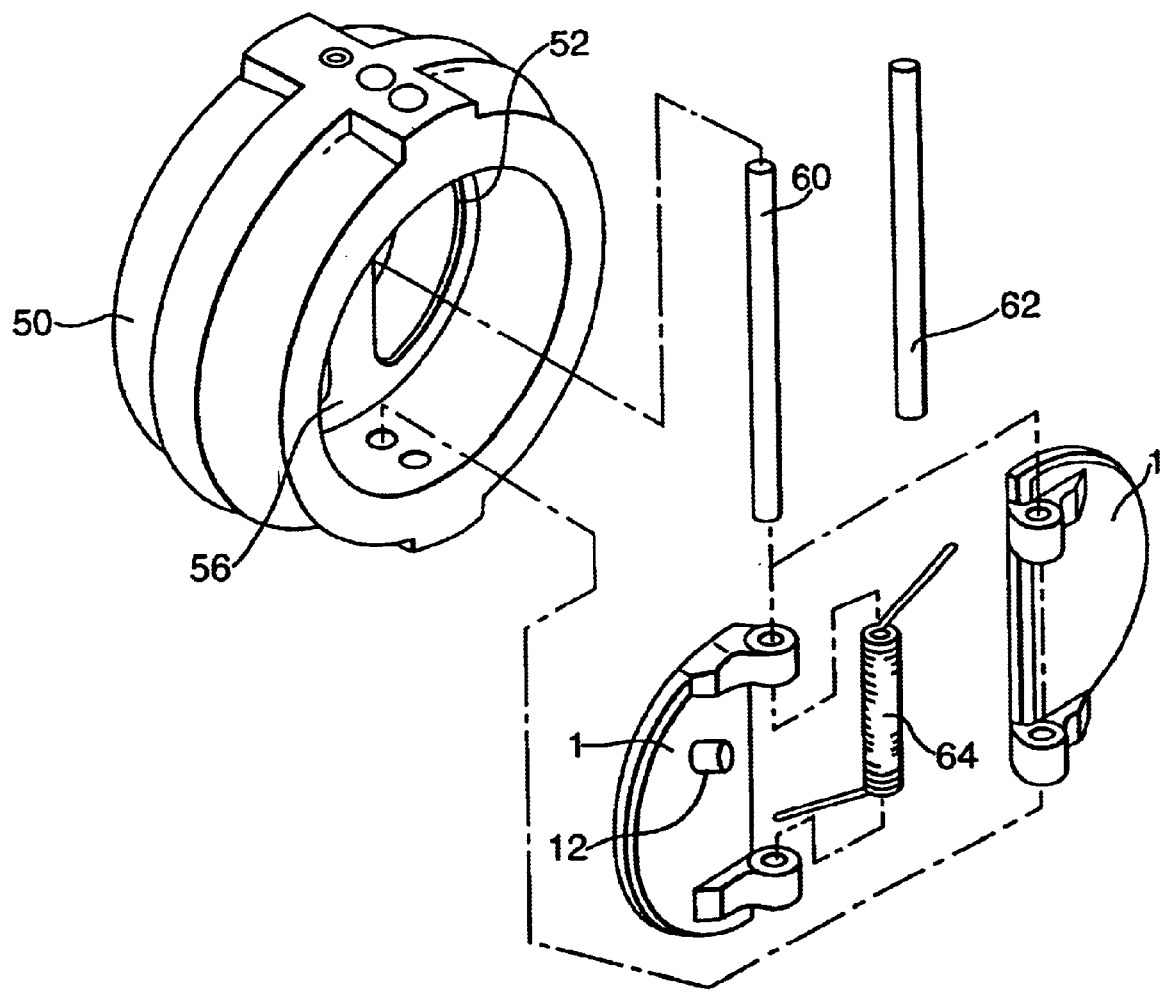
FIG. 12 is a diagrammatic cross-section of a dual plate check valve.

FIG. 12 illustrates a device (12) incorporated into the plate (1) of a dual plate check valve. Generally only one device will be necessary but if appropriate a device may be provided on each plate of a dual plate check valve or more than one device may be included in or on a single plate (1).

In FIG. 12 the valve has an approximately cylindrical body (50) which has an axial bore through it for the passage of fluid. An annular portion (52) projects into the aperture from the inner wall of the valve body (50). A cross-member (54) extends diametrically across the valve body (50) and together with the annular projection (52) defines two D-shaped apertures. The annular projection (52) and the diametrical cross-member (54) comprise the valve seat (56) on which valve plates (1) rest when the valve is in a closed state. A D-shaped or generally semi-circular valve plate (1) is provided for each D-shaped aperture in the valve body (50).

Fluid may flow through the valve from an upstream side of the valve seat to a downstream side thereof. As shown in FIG. 12, the two valve plates are located on the downstream side of the valve seat (56). The two plates (1) have lugs by which they are pivotally connected to a hinge pin (60) extending diametrally across the valve body (50) parallel to the cross-member (54). In the valve closed position, the two generally semi-circular or D-shaped plates (58) are pivoted around hinge pin (60) into sealing contact with the valve seat (56). A stop pin (62) extends diametrically across the valve body (50) parallel to and downstream of the hinge pin (60) to limit the degree of opening of the valve plates (58). Optionally a spring or springs (64) bias the dual valve plates (58) into sealing contact with the valve seat (56). The hinge pin (60), stop pin (62) and plates (58) may be supported in the valve body (50) by means of a conventional retainer system (not shown), or by means of inserts as described in WO 95/27163.

The present invention may advantageously be used with a dual plate check valve as disclosed in PCT/GB94/02627 combining the low or zero backpressure leakage characteristics of such a check valve with the anti-pressure surge response of the present invention.

What is claimed is:

1. An anti-pressure surge device mounted in or on a closure member of a check valve to permit flow in the upstream direction the check valve is supposed to prevent when subject to a back pressure shock wave on the downstream side of the valve, the device comprising a fast acting flow relieving valve having flow paths sufficient in the open position to relieve at least 5% of the reverse flow on closure of said check valve closure member.

2. Apparatus according to claim 1 wherein the anti-pressure surge device permits flow in the reverse direction when the differential pressure between the downstream and the upstream side of the check valve exceeds a predetermined value.

3. Apparatus according to claim 1 wherein the anti-pressure surge device comprises a sealing element mounted on a piston wherein said piston is movable by said back pressure shock wave against a resilient means.

4. Apparatus according to claim 3 wherein said piston is slidably mounted in a ring element comprising openings enabling the passage of fluid therethrough when said piston is caused to move by said back pressure shock wave against said resilient means.

5. Apparatus according to claim 1 wherein said device comprises a poppet valve.

6. Apparatus according to claim 1 where said device comprises a high flow pressure balanced surge relief valve.

7. A check valve comprising at least one anti-pressure surge device mounted in or on a closure member of said check valve to permit flow in the upstream direction the check valve is supposed to prevent when subject to a back pressure shock wave on the downstream side of the valve wherein the aggregate flow path cross section in the open position of the at least one anti-pressure surge device is between 2% and 20% of the flow path cross section in the open position of the check valve.

8. A pipeline comprising at least one anti-pressure surge device mounted in or on a closure member of a check valve to permit flow in the upstream direction the check valve is supposed to prevent when subject to a back pressure shock wave on the downstream side of the valve the anti-pressure surge device opens to permit flow in the upstream direction when the pressure differential between the downstream and upstream side of the check valve exceeds by a predetermined percentage the maximum stagnant flow pressure on the downstream side of the check valve.

9. A pipeline according to claim 8 wherein the anti-pressure surge device permits reverse flow when the back pressure shock wave on the downstream side of the check valve approaches a predetermined value less than the maximum rating of the pipeline.

10. A pipeline according to claim 8 wherein the anti-pressure surge device opens to permit flow in the upstream direction when the pressure differential between the downstream and upstream side of the check valve exceeds by a predetermined percentage the maximum stagnant flow pressure on the downstream side of the check valve and wherein the predetermined percentage is between 5 and 20%.

11. A pipeline according to claim 8 wherein the anti-pressure surge device opens to permit flow in the upstream direction when the pressure differential between the downstream and upstream side of the check valve exceeds by a predetermined percentage the maximum stagnant flow pressure on the downstream side of the check valve and wherein the predetermined percentage is between 10 and 15%.

12. A pipeline according to claim 8 wherein the anti-pressure surge device has a flow path sufficient to provide a reduction in the Joukowsky pressure compared with a check valve of the same design without anti-pressure surge device of at least 10% to 40% or more.

13. A pipeline according to claim 8 wherein the anti-pressure surge device enables dissipation of at least 10% of the pressure energy on valve closure compared with a check valve of the same design without anti-pressure surge device.

14. A pipeline according to claim 8 wherein the anti-pressure surge device enables dissipation of at least 40% of the pressure energy on valve closure compared with a check valve of the same design without anti-pressure surge device.

15. A pipeline comprising at least one check valve comprising at least one anti-pressure surge device mounted in or on a closure member of said check valve to permit flow in the upstream direction the check valve is supposed to prevent when subject to a back pressure shock wave on the downstream side of the valve wherein the aggregate flow path cross section in the open position of the anti-pressure surge devices is between 2% and 20% of the flow path cross section in the open position of the check valve.

16. A pipeline according to claim 15 wherein the anti-pressure surge device permits reverse flow when the back pressure shock wave on the downstream side of the check valve approaches a predetermined value less than the maximum rating of the pipeline.

17. A pipeline according to claim 15 wherein the anti-pressure surge device opens to permit flow in the upstream direction when the pressure differential between the downstream and upstream side of the check valve exceeds by a predetermined percentage the maximum stagnant flow pressure on the downstream side of the check valve.

18. A pipeline according to claim 15 wherein the anti-pressure surge device opens to permit flow in the upstream direction when the pressure differential between the downstream and upstream side of the check valve exceeds by a predetermined percentage the maximum stagnant flow pressure on the downstream side of the check valve and wherein the predetermined percentage is between 5 and 20%.

19. A pipeline according to claim 15 wherein the anti-pressure surge device opens to permit flow in the upstream direction when the pressure differential between the downstream and upstream side of the check valve exceeds by a predetermined percentage the maximum stagnant flow pressure on the downstream side of the check valve and wherein the predetermined percentage is between 10 and 15%.

20. A pipeline according to claim 15 wherein the anti-pressure surge device has a flow path sufficient to provide a reduction in the Joukowsky pressure compared with a check valve of the same design without anti-pressure surge device of at least 10% to 40% or more.

21. A pipeline according to claim 15 wherein the anti-pressure surge device enables dissipation of at least 10% of the pressure energy on valve closure compared with a check valve of the same design without anti-pressure surge device.

22. A pipeline according to claim 15 wherein the anti-pressure surge device enables dissipation of at least 40% of the pressure energy on valve closure compared with a check valve of the same design without anti-pressure surge device.

* * * * *